(12) United States Patent
Zhang et al.

(10) Patent No.: US 7,809,279 B2
(45) Date of Patent: Oct. 5, 2010

(54) SYSTEM AND METHOD USING DIFFERENTIAL LOOP GAIN FOR FAULT IDENTIFICATION IN LINE MONITORING EQUIPMENT

(75) Inventors: Hongbin Zhang, Marlboro, NJ (US); Ralph Brian Jander, Freehold, NJ (US)

(73) Assignee: Tyco Electronics Subsea Communications LLC, Morristown, NJ (US)

( * ) Notice: Subject to any disclaimer, the term of this patent is extended or adjusted under 35 U.S.C. 154(b) by 491 days.

(21) Appl. No.: 11/829,422

(22) Filed: Jul. 27, 2007

(65) Prior Publication Data
US 2009/0028550 A1 Jan. 29, 2009

(51) Int. Cl.
*H04B 10/02* (2006.01)
(52) U.S. Cl. .............. 398/177; 398/33; 398/16; 398/18; 398/20; 398/181; 356/73.1; 370/241; 370/242; 370/243
(58) Field of Classification Search ............. 398/16, 398/177, 181, 173, 21, 17, 33, 180, 11, 18, 398/20, 178, 25, 26, 27, 28, 30, 31, 37, 38; 370/241, 242, 243; 356/73.1
See application file for complete search history.

(56) References Cited

U.S. PATENT DOCUMENTS

| 5,926,263 | A | 7/1999 | Lynch et al. |
| 5,969,833 | A * | 10/1999 | Jensen ................ 398/34 |
| 6,028,684 | A | 2/2000 | Kidorf |
| 6,301,036 | B1 | 10/2001 | Spencer |
| 6,414,775 | B1 | 7/2002 | Pedersen |
| 6,708,004 | B1 | 3/2004 | Homsey |
| 6,842,586 | B2 | 1/2005 | Neubelt et al. |
| 7,009,693 | B2 | 3/2006 | Takashina |
| 7,035,545 | B2 | 4/2006 | Meli et al. |
| 7,388,657 | B2 | 6/2008 | Abbott |
| 2004/0047295 | A1 | 3/2004 | Morreale |
| 2004/0047629 | A1 | 3/2004 | Evangelides, Jr. et al. |
| 2004/0095569 | A1 | 5/2004 | Kan |
| 2004/0096214 | A1 * | 5/2004 | Morreale et al. ........... 398/33 |
| 2007/0041006 | A1 | 2/2007 | Abbott |
| 2009/0190930 | A1 * | 7/2009 | Von Der Weid ............. 398/81 |

FOREIGN PATENT DOCUMENTS

| EP | 1372272 | 12/2003 |
| WO | 2004056017 | 7/2004 |

OTHER PUBLICATIONS

International Search Report and Written Opinion dated Oct. 6, 2008 issued in related International Patent Application No. PCT/US08/71395.

(Continued)

*Primary Examiner*—Hanh Phan
(74) *Attorney, Agent, or Firm*—Grossman, Tucker, Perreault & Pfleger, PLLC

(57) ABSTRACT

A system and method using differential loop gain for fault analysis in line monitoring equipment. Differential loop gain data is calculated from loop gain data, and fault analysis is conducted using differential loop gain data, e.g. by comparing the differential loop gain data to predefined fault signatures.

28 Claims, 8 Drawing Sheets

OTHER PUBLICATIONS

European Search Report dated Dec. 5, 2006 received in European Patent Application Serial No. 06119183.9 (6 pages).
Cornwell, et al., "In-service Line Performance Monitoring with COTDR" Red Sky Systems, Poster We 15.2 article. (3 pages), 1993.
USPTO Office Action mailed Aug. 27, 2007 issued in U.S. Appl. No. 11/209,181 (11 pages).
European Office Action mailed on Sep. 13, 2007 in connection with corresponding European Patent Application No. 06119183.9.
European Office Action dated Feb. 8, 2010 issued in related European Patent Application No. 06119183.9-2415.

* cited by examiner

SYSTEM AND METHOD USING DIFFERENTIAL LOOP GAIN FOR FAULT IDENTIFICATION IN LINE MONITORING EQUIPMENT

TECHNICAL FIELD

The present application relates to communication systems and, more particularly, to a system and method using differential loop gain for fault identification in transmission line monitoring equipment.

BACKGROUND

In long distance optical communication systems it may be important to monitor the health of the system. For example, monitoring can be used to detect faults or breaks in the optical transmission cable, faulty repeaters or amplifiers or other problems with the system.

Known monitoring techniques include use of line monitoring equipment that generates a test signal representing a pseudo random bit sequence. The line monitoring equipment may transmit the test signal with the information signals, e.g. in wavelength division multiplexed system. The test signal may be returned to the line monitoring equipment through a high-loss loopback (HLLB) path within an amplifier or repeater. The line monitoring equipment may then separate the returned test signal from the data signals, and process the returned test signal to obtain data representing the HLLB loop gain imparted to the test signal in its propagation from the line monitoring equipment, through the HLLB and any intervening optical paths and amplifiers, and back to the line monitoring equipment. Significant deviations in HLLB loop gain may indicate a fault in the system.

In an undersea optical communication system, repeater pump power loss and increased fiber span loss may be primary failure mechanisms resulting in HLLB loop gain deviations from normal values. In a known system, significant variations in HLLB loop gain, e.g. above a predefined alarm threshold, may trigger a system alarm. Choice of the alarm threshold in such a system may require discrimination between normal system fluctuations and measurement errors and real transmission path faults. Unfortunately, this discrimination may be difficult since HLLB loop gain measurements may be generally insensitive to physical changes in the transmission path due, in part, to the repeater loop back output-to-output architecture, as well as gain mechanisms in the repeater amplifier, e.g. self-gain regulation Consequently, real path changes for non-devastating failures in such changes may result in HLLB loop gain changes that are only slightly detectable given typical measurement errors and system fluctuations.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
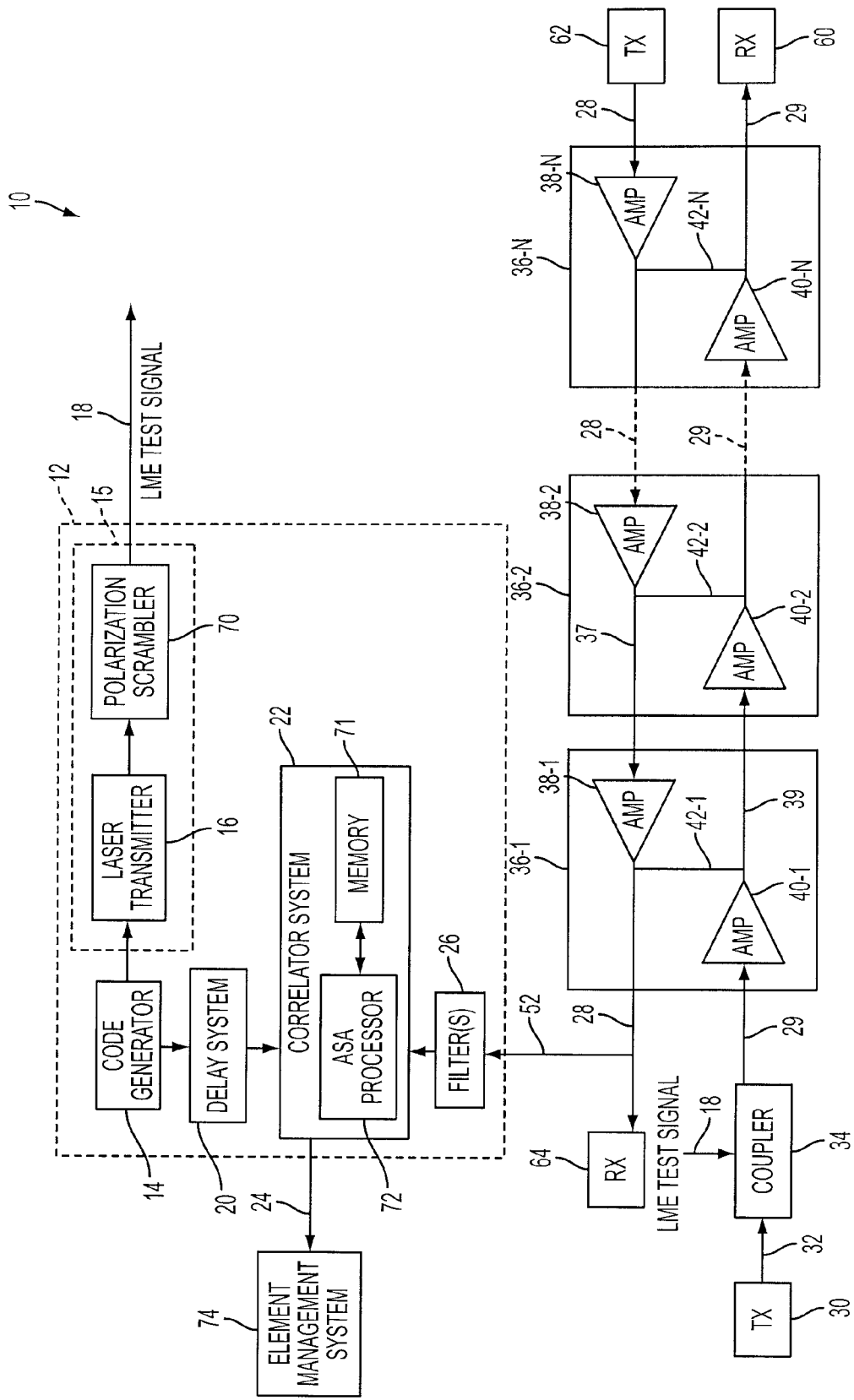
FIG. 1 is a simplified block diagram of one exemplary embodiment of a system consistent with the present disclosure.

FIG. 1 is a simplified block diagram of one exemplary embodiment of a WDM transmission system 10 including line monitoring equipment (LME) 12 consistent with the present disclosure. In general, the system 10 may be configured to calculate a differential loop gain value associated with each repeater/amplifier. Variation in the differential loop gain may be used to generate a system alarm indicating a fault in the system. An automated signature analysis (ASA) algorithm may be applied to the differential loop gain to identify the nature of the fault.

Those of ordinary skill in the art will recognize that the system 10 has been depicted as a highly simplified point-to-point system form for ease of explanation. It is to be understood that a system and method consistent with the present disclosure may be incorporated into a wide variety of network components and configurations. The illustrated exemplary embodiments herein are provided only by way of explanation, not of limitation.

In the illustrated exemplary embodiment, the transmission system 10 includes a laser transmitter 30 and an optical fiber pair, including fibers 28 and 29, for carrying optical signals. Fibers 28 and 29 may be long distance optical fiber lines for deployment, for example, under the ocean. Optical fibers 28 and 29 may be unidirectional fibers and carry signals in opposite directions. Fibers 28 and 29 together establish a bidirectional path for transmitting signals. While the illustrated exemplary monitoring system may be described as monitoring a transmission system including two unidirectional fibers 28 and 29, a system consistent with the present disclosure may be used to monitor transmission systems employing a single bidirectional fiber.

Laser transmitter 30 may be a wavelength-division multiplexing (WDM) transmitter configured to transmit optical data on a plurality of channels (or wavelengths) over fiber 29 to a WDM receiver 60. The transmitter and receiver, of course, are shown in highly simplified form for ease of explanation. Laser transmitter 30 may include a plurality of laser transmitters each transmitting an optical data signal using a different channel or wavelength, and a multiplexer for combining the data signals into an aggregate signal transmitted over fiber 29. The receiver may demultiplex and detect the transmitted data signals. Similarly, WDM data signals may be transmitted over fiber 28 from a transmitter 62 to a receiver 64, i.e. in a direction opposite of those signals on fiber 29. Alternatively, only a single channel of data may be carried on fibers 28 and/or 29.

The line monitoring equipment (LME) 12 may be configured for monitoring the health of the system 10. In the illustrated exemplary embodiment, the LME 12 includes a code generator 14, a test signal transmitter 15 including a laser transmitter 16 and a polarization scrambler 70, a delay system 20, a correlator system 22 including an ASA processor 72 and computer readable memory, and a filter 26. LME 12 may be configured to provide an output 24, e.g. an alarm, to an element management system 74 when a fault is detected in the system 10.

The code generator 14 may be configured for generating and outputting a test code, such as a pseudo-random sequence (PRS) of code. A variety of code generator and code configurations are known to those of ordinary skill in the art. The output of the code generator 14 may be coupled to the laser transmitter 16. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

The laser transmitter 16 may take a known configuration, e.g. a distributed feedback laser (DFB), and may be configured to produce an optical output at a carrier wavelength $\lambda_0$ that may be different from the wavelengths of all of the data channels to be transmitted on the transmission system. The carrier wavelength $\lambda_0$ may, for example, by at an edge of the spectral bandwidth of the system or may be between data channels. In one embodiment, the laser transmitter may be configured to provide an optical output at a plurality of different carrier wavelengths. For example, the laser transmitter may provide an output at a short LME wavelength at the short wavelength end of the data signal transmission band, i.e. adjacent the shortest wavelength data channel, and a long LME wavelength at the long wavelength end of the data signal transmission band, i.e. adjacent the longest wavelength data channel. In one embodiment, the short LME wavelength may be 1537 nm and the long LME wavelength may be 1563 nm. The power of the laser output may be set below the power level of the data signals communicated over fibers 28 and 29 to minimize the impairment of the data signals.

Laser transmitter 16 may generate an LME test signal, e.g. on both the long and short LME wavelengths, representative of the code received from code generator 14. The LME test signal may be provided as an LME test signal output 18 of the test signal transmitter 15. In one embodiment, the output of the code generator may directly modulate the amplitude of the laser output. Other configurations for imparting the code to the output light from the laser transmitter are known. For example, the code may be imparted by an amplitude or other modulator coupled to an output of the laser transmitter 16.

In the illustrated exemplary embodiment an optional polarization scrambler 70 is coupled to the laser transmitter 16 for scrambling the polarization of the LME test signal. The polarization scrambler may take a known configuration. In one embodiment, the polarization scrambler 70 may alter the state of polarization of the LME test signal in such a way that the average value of the state of polarization over a polarization modulation period is reduced from unity. Accordingly, the LME test signal output 18 of the test signal transmitter 15 may have a degree of polarization substantially equal to zero and may be considered polarization scrambled.

In the illustrated exemplary embodiment, a coupler 34 may combine the WDM data 32 from transmitter 30 and LME test signal 18 and output this combined signal for transmission onto fiber 29. A plurality of optical repeaters 36-1, 36-2 . . . 36-N may be coupled to the optical fibers 28 and 29. Each repeater may include a first amplifier 40-1, 40-2 . . . 40-N, respectively, for amplifying optical signals transmitted over fiber 29 to receiver 60, and a second amplifier 38-1, 38-2 . . . 38-N, respectively, for amplifying optical signals transmitted over fiber 28 to receiver 64. Each repeater may also include an associated loopback path 42-1, 42-2 . . . 42-N, e.g. a high loss loopback path, which returns a portion of the signal transmitted on fiber 29 to fiber 28 for transmission to LME 12.

Signal 52 may be coupled to the filter 26, and may carry all signals present on fiber 28, including the combined WDM data 32 and LME test signals 18 returned by loopback paths 42-1, 42-2 . . . 42-N over fiber 28. Filter 26 may be wavelength selective and pass only the wavelengths of the returned LME test signal 18 to the correlator 22.

The LME test signals returned to LME 12 by each repeater via fiber 28 are delayed from the original LME test signal 18 by a time period proportional to the distance of the delay path for each repeater. For the first repeater 36-1, for example, the time delay $t_{s1}$ is proportional to the distance of the delay path through the first repeater 36-1. The distance $d_1$ through the first repeater may be calculated as the distance from the code generator 14, to transmitter 16, polarization scrambler 70, to coupler 34, to the first repeater 36-1, through loopback path 42-1, to the optical filter 26, and to correlator 22. The time delay $t_{s1}$ for the LME test signal returned by the first repeater 36-1 may therefore be calculated as $t_{s1}=d_1/c$, where c is the speed of light. Similarly, the time delay $t_{s2}$ for the LME test signal returned by the second repeater 36-2 can be calculated based on the known distance, $d_2$, of the delay path for the second repeater 36-2, and may be calculated as $t_{s2}=d_2/c$. Likewise, time delays for additional repeaters in the system can also be calculated based on the known distances of their delay paths.

To facilitate a correlation operation by correlator 22, delay system 20 may receive the transmitted codes from code generator 14 and output a plurality of associated delayed codes to correlator 22. Delay system 20 may output each code after the time delays corresponding to each repeater, i.e., $t_{s1}$ (corresponding to time delay for the first repeater 36), $t_{s2}$ (corresponding to the time delay for the second repeater 44), etc. In other words, delay system 20 may delay the codes based on the location of each repeater.

Correlator 22 may then correlate the returned LME test signal with delayed codes from the delay system 20. Correlator 22 may correlate electrical signals or optical signals. Where correlator 22 correlates electrical signals, LME 12 may further include an optical-to-electrical converter connected between filter 26 and the correlator 22 for converting the optical signals output by filter 26 into electrical signals.

In the correlation operation, correlator 22 may be configured calculate loop gain data associated with each repeater 36-1, 36-2 . . . 36-N. The loop gain data for each receiver may be calculated by comparing the returned LME test signal received from the repeater with the associated delayed test code. In the illustrated exemplary embodiment, the loop gain for any repeater 36-i may represent the gain and the loss imparted to the test signal from the code generator 14, to transmitter 16, to polarization scrambler 70, to coupler 34, to the repeater 36-i, through loopback path 42-i, to the optical filter 26, and to correlator 22.

Consistent with the present disclosure, the correlator 22 may be configured to convert loop gain data associated with each repeater to differential loop gain data associated with each repeater 36-1, 36-2 . . . 36-N. The differential loop gain for each repeater 36-i, may be calculated as the loop gain associated with repeater 36-i, minus the loop gain associated with repeater 36-(i−1). For example, the differential loop gain associated with repeater 36-2 may be calculated as the loop gain for repeater 36-2, minus the loop gain for repeater 36-1. In the illustrated exemplary embodiment, since loss associated with the HLLB paths of successive repeaters may essentially cancel each other, the differential loop gain associated with repeater 36-2 may essentially represent the gain imparted to the test signal by amplifiers 40-2 and 38-1, minus the loss imparted to the test signal on paths 39 and 37.

Differential loop gain may thus rely on only four random variables, i.e. two gain variables and two loss variables. Compared to simple loop gain, therefore, differential loop gain may exhibit a relatively small maximum/minimum deviation due to normal system fluctuations, and may not be particularly susceptible to distance. These factors may allow setting of a reliable gain variation threshold at which a fault detection trigger may be set.

Figure 2:
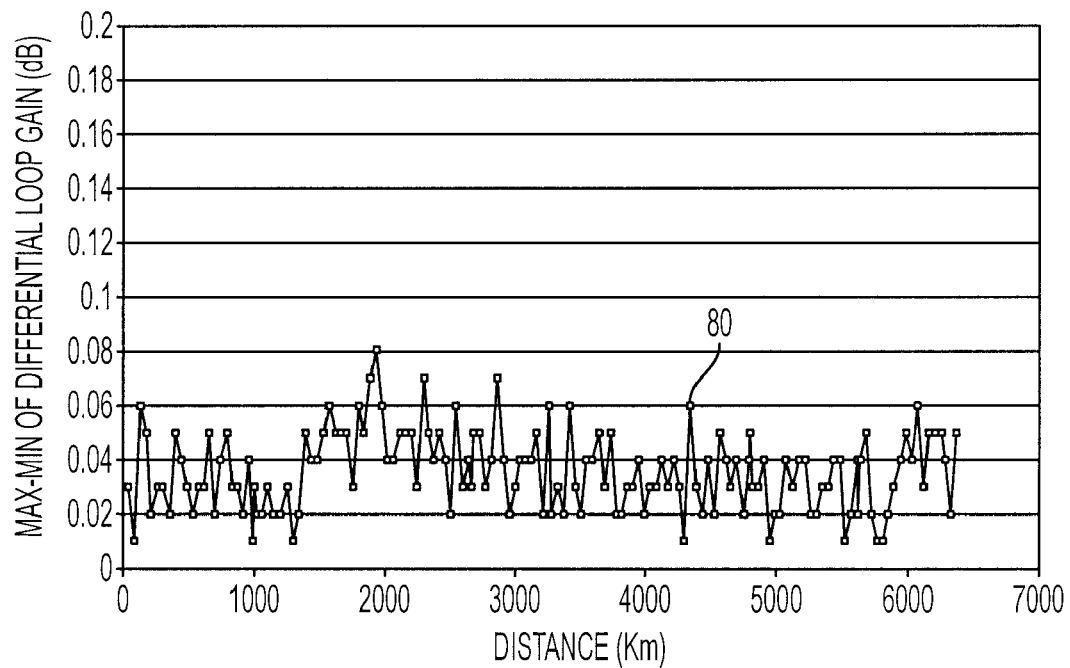
FIG. 2 includes a plot of differential loop gain maximum and minimum vs. distance for an exemplary transmission system consistent with the present disclosure.

FIG. 2, for example, includes a plot 80 of differential loop gain maximum and minimum vs. distance for an exemplary transmission system including 140 repeaters wherein the differential loop gain data was obtained over 20 independent measurements. As shown, the maximum value of the differential loop gain in plot 80 may be about 0.08 dB. This relatively low maximum/minimum deviation value, e.g. compared to maximum/minimum deviation values exhibited by simple loop gain data, facilitates setting of a relatively low gain variation threshold at which a fault detection trigger may be set. In one embodiment, for example, the correlator 22 may provide an alarm 24 to an element management system 74 when the change of the differential loop gain in any repeater exceeds a predetermined differential loop gain variation threshold of 0.2 dB.

In the illustrated exemplary embodiment the correlator 22 includes an ASA processor 72 and a computer readable memory 71. The ASA processor 72 may be configured to apply one or more ASA algorithms to the differential loop gain data calculated by the correlator 22 to characterize the type of fault occurring in the transmission system 10. The ASA process may be triggered by an alarm generated when differential loop gain in a repeater exceeds a predetermined differential loop gain variation threshold. As a result of the ASA process, the correlator may provide an output 24 to an element management system 74 indicating the type of fault.

The ASA algorithms may take a variety of configurations and may be implemented as one or more computer programs or applications, for example, running on a computer system such as the ASA processor 72. Computer programs or applications, such as the ASA algorithms, may be stored on memory 71, or other machine readable medium (e.g., a hard disk, a CD ROM, a system memory, optical memory, etc.) and may be executed by a processor, such as the ASA processor 74, to cause the processor to perform all or part of the functions described herein as being performed by the correlator 22. It is expected that such a computer program product may be distributed as a removable machine-readable medium (e.g., a diskette, CD-ROM), preloaded with a system (e.g., on system ROM or fixed disk), or distributed from a server or electronic bulletin board over a network (e.g., the Internet or World Wide Web). Those of ordinary skill in the art will recognize that the correlator functionality may be implemented using any combination of hardware, software, and/or firmware to provide such functionality.

In one embodiment, the ASA processor 72 may be configured to compare current differential loop gain data with predetermined differential loop gain fault signatures corresponding to differential loop gain resulting from faults in the optical communication system. The comparison of differential loop gain data with the predetermined differential loop gain fault signatures may be performed using known signal processing techniques, such as matched filters. Predetermined fault signatures may be established for system faults such as extra pump loss, and extra fiber loss. Of course, other faults may be detected and examined.

Extra pump loss may be characterized by complete or partial failure of amplifier pump lasers within a repeater. For example, in the exemplary embodiment of FIG. 1 extra pump loss in repeater 36-2 may result in a complete or partial reduction in the gain imparted by amplifiers 38-2 and 40-2. In general, optical amplifiers in a transmission line are run in moderate compression and changes in the output signal power of the repeater tends to self-correct after a few amplifiers by the adjustment of the gain. For example, if pump power in amplifiers 38-2 and 40-2 of FIG. 1 is reduced the output power of repeater 36-2 is reduced, and gain imparted by amplifier 38-1 and 40-3 may automatically increase as a result gain control functionality within repeaters 36-1 and 36-3.

Figure 3:
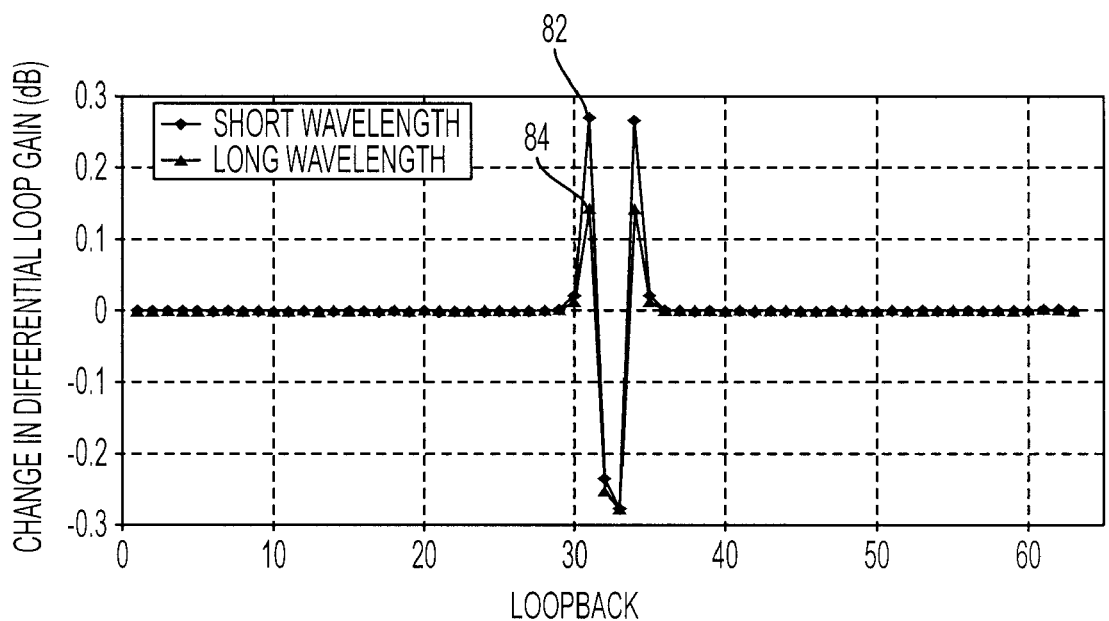
FIG. 3 includes plots of change in differential loop gain vs. repeater loop back number associated with a 3 dB reduction in repeater pump power in an exemplary system consistent with the present disclosure.

FIG. 3 includes plots 82, 84 of a change in differential loop gain vs. repeater loop back number associated with a mid-system 3 dB reduction in repeater pump power, i.e. extra pump loss, in an exemplary system consistent with the present disclosure. Plot 82 illustrates the change in differential loop gain vs. loopback number associated with a short LME wavelength, i.e. at the short wavelength end of the transmission band, and plot 84 illustrates the change in differential loop gain vs. loopback number associated with a long LME wavelength, i.e. at the long wavelength end of the transmission band. As shown, the 3 dB reduction in repeater pump power results in a decrease of the differential loop gain at the fault repeater in excess of 0.2 dB for both the short LME wavelength and the long LME wavelength.

Extra fiber loss may occur and may be characterized by additional or complete loss of transmission through the fiber path, e.g. in path between amplifiers 40-1 and 40-2 in FIG. 1. In general, when extra fiber loss appears in the fiber path, gain control algorithms within other system repeaters may cause an adjustment in gain imparted by other repeaters. For example, if extra fiber loss appears in the path between amplifiers 40-1 and 40-2 in FIG. 1, the gain imparted by amplifier 40-2 may automatically increase as a result of gain control functionality within repeater 36-2.

Figure 4:
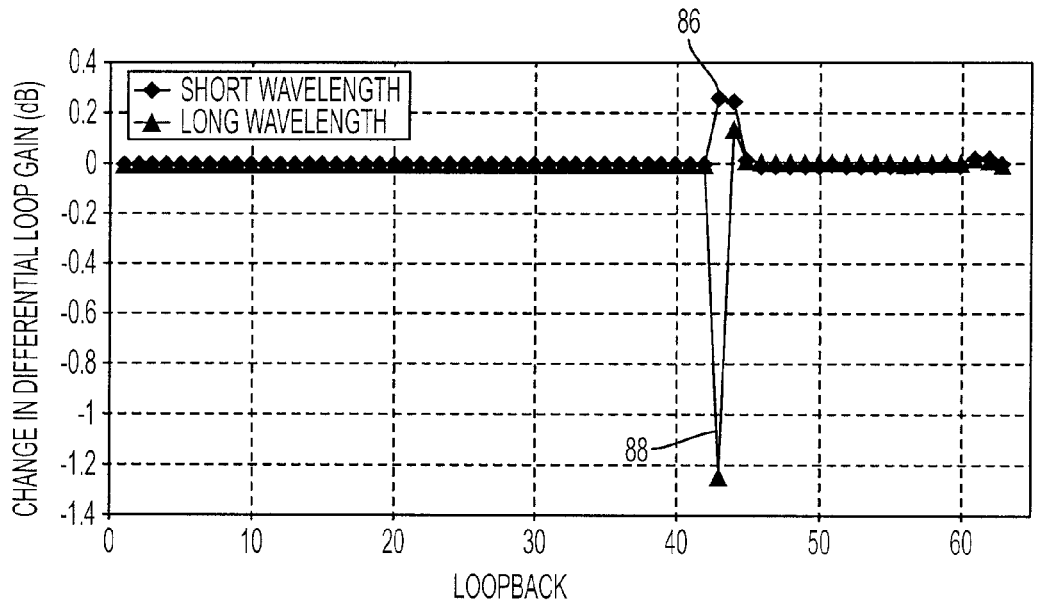
FIG. 4 includes plots of a change in differential loop gain vs. repeater loop back number associated with a 3 dB extra fiber loss in an exemplary system consistent with the present disclosure.

FIG. 4 includes plots 86, 88 of a change in differential loop gain vs. repeater loop back number associated with a mid-system 3 dB extra fiber loss in an outbound direction in an exemplary system consistent with the present disclosure. Plot 86 illustrates the change in differential loop gain vs. loopback number associated with a short LME wavelength, and plot 88 illustrates the change in differential loop gain vs. loopback number associated with a long LME wavelength. As shown, extra fiber loss results in a significant difference between the differential loop gain for the short LME wavelength and the long LME wavelength. A difference between the differential loop gain for the short LME wavelength and the long LME wavelength is referred to herein as differential loop gain tilt.

Figure 5:
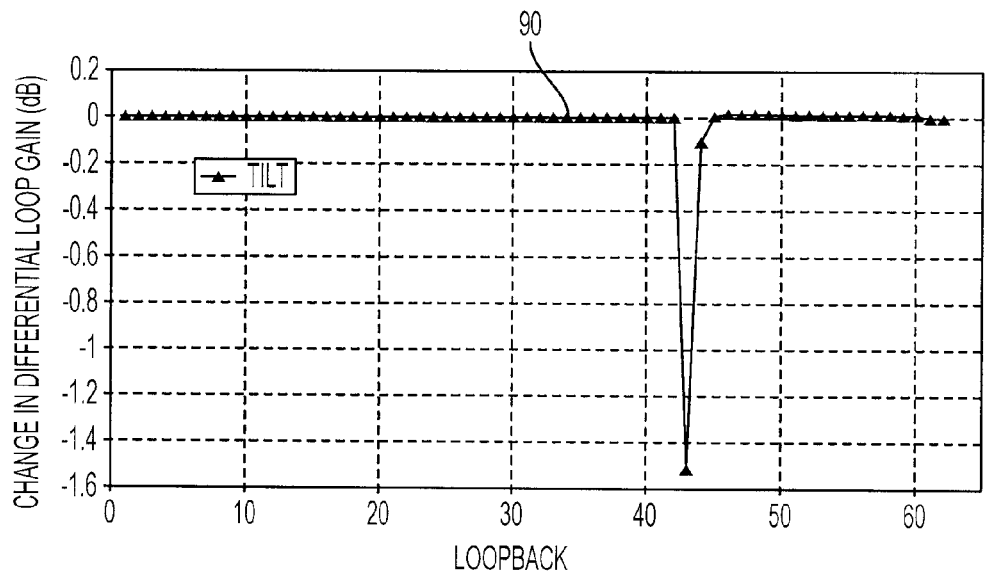
FIG. 5 is plot of differential loop gain tilt vs. repeater loop back number associated with the extra fiber loss condition depicted in FIG. 4.

FIG. 5 includes plot 90 of differential loop gain tilt vs. repeater loop back number associated with the extra fiber loss condition depicted in FIG. 4. As shown, the differential loop gain tilt associated with the extra fiber loss may be about −1.5 dB. In contrast, differential loop gain tilt associated with extra pump loss, as illustrated in FIG. 3, may only be on the order of about 0.1 dB. In general, this difference in differential loop gain tilt may be associated with the output-to-output HLLB architecture. For example, when pump loss is present, differential loop gain may involve two amplifiers with opposite gain changes and opposite gain tilt. The opposite gain tilts may substantially cancel each other. When extra fiber loss is present in one of an outbound or inbound direction, differential loop gain may involve only one amplifier with a gain change causing gain tilt. When extra fiber loss is present in both outbound and inbound directions within the same repeater span, differential loop gain may involve two amplifiers with the same direction of gain change and the same direction of gain tilt. Consistent with the present disclosure, therefore, gain tilt may be used in discriminating between extra fiber loss and extra pump loss.

As illustrated for example in FIGS. 3-5, extra pump loss and extra fiber loss faults produce distinct differential loop gain fault signatures. Since differential loop gain relies essentially on only four variables, i.e., the gain of two amplifiers and two input fiber losses, these fault signatures may be generally independent of system type or system location. Extra pump loss and extra fiber loss in a system may be detected and identified by comparison of differential loop gain data with predetermined loop gain fault signatures. Although ASA is described herein in connection with comparison of differential loop gain data with predetermined loop gain fault signatures, it is to be understood that ASA consistent with the present disclosure may be involve comparison fault signatures with gain data other than, or in addition to, differential loop gain data.

In one embodiment, the predetermined loop gain fault signatures may be configured as a set of set of matched filters that are orthogonal to each other and have an impulse response function approximating the change in differential loop gain data represented by extra pump loss and extra fiber loss, respectively. A response from a low pass one of the matched filters may indicate an extra fiber loss fault, and a response from a high pass one of the matched filters may indicate an extra pump loss fault.

Figure 6:
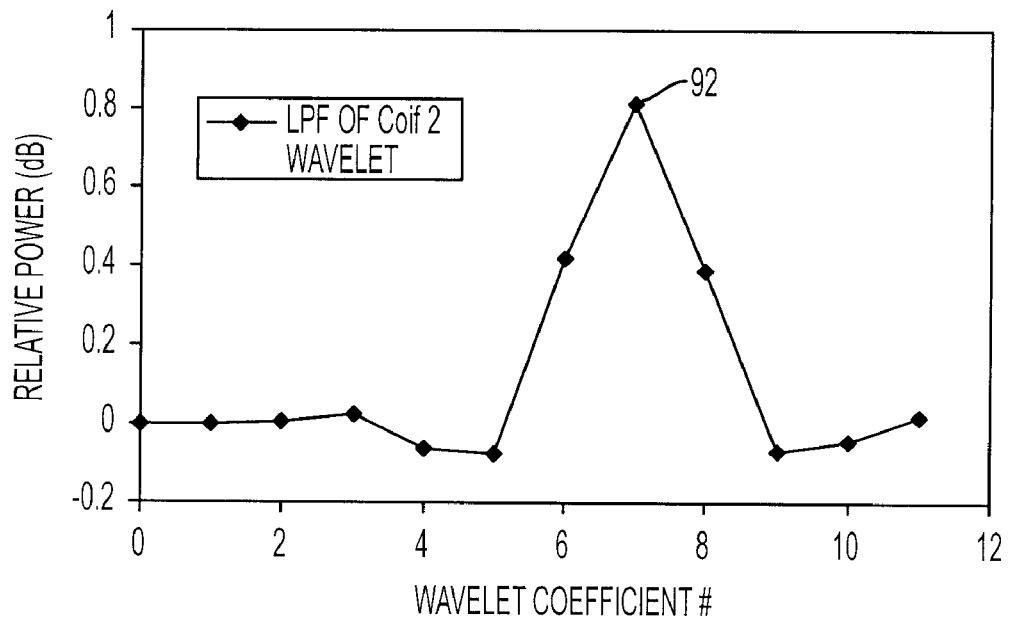
FIG. 6 is plot of relative power vs. wavelength coefficient illustrating the impulse response of a wavelet function corresponding to a low pass filter consistent with the present disclosure.
Figure 7:
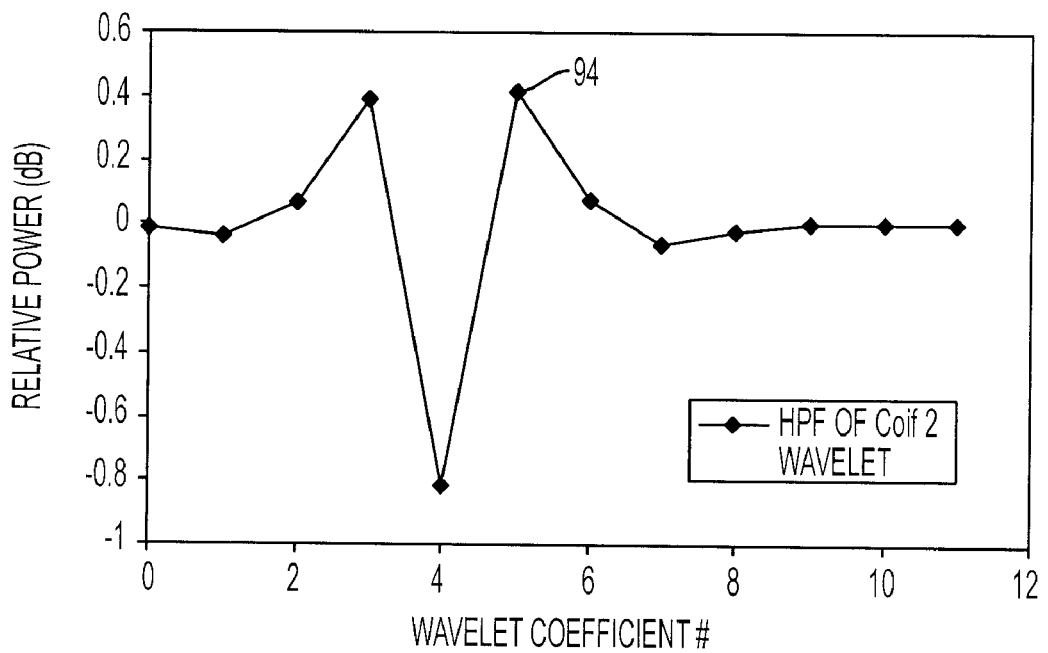
FIG. 7 is plot of relative power vs. wavelength coefficient illustrating the impulse response of a wavelet function corresponding to a high pass filter consistent with the present disclosure.

The matched filters may, for example, be represented by associated wavelet functions and the differential loop gain data may be analyzed with respect the wavelet functions by the ASA processor 72. FIGS. 6 and 7 illustrate exemplary impulse responses 92, 94 of separate Coif stationary wavelet transform (SWT) functions that may be useful in an embodiment consistent with the present disclosure. In particular, FIG. 6 illustrates the impulse response 92 of a wavelet function corresponding to a low pass filter that approximates the change in differential loop gain data resulting form extra fiber loss, e.g. as illustrated in FIG. 4. FIG. 7 illustrates the impulse response 94 of a wavelet function corresponding to a high pass filter that approximates the change in differential loop gain data resulting form extra pump, e.g. as illustrated in FIG. 3.

The ASA processor 72 may be configured to continuously compare calculated differential loop gain data to the wavelet functions and may provide an output 24 indicating an extra fiber loss or extra pump loss when the wavelet function for extra fiber loss or extra pump loss matches the calculated differential loop gain data. In one embodiment, to match the differential loop-gain data with the wavelet functions, the differential loop-gain data may be dilated by inserting zeros and convolved with a low pass filter and then down sampled. A stationary wavelet transformation may then be implemented and a sub-band of wavelet coefficients may be used as the fault signature.

Figure 8A:
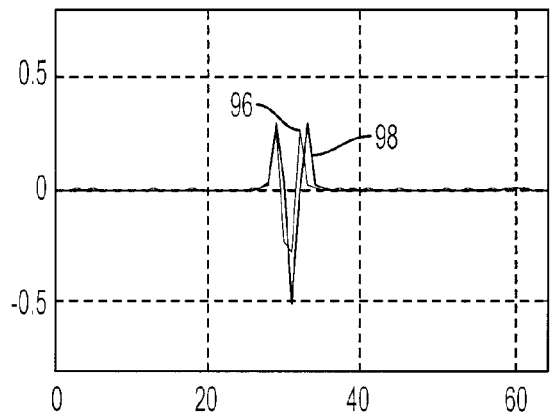
FIG. 8A includes a plot of a change in differential loop gain vs. repeater loop back number associated with a 3 dB reduction in repeater pump power, along with a plot of an impulse response for a high pass filter wavelet function consistent with the present disclosure.
Figure 8B:
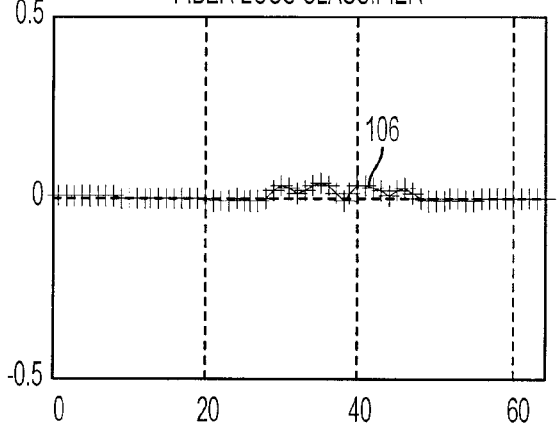
FIG. 8B is a plot of a low pass filter response to the change in differential loop gain depicted in FIG. 8A.
Figure 8C:
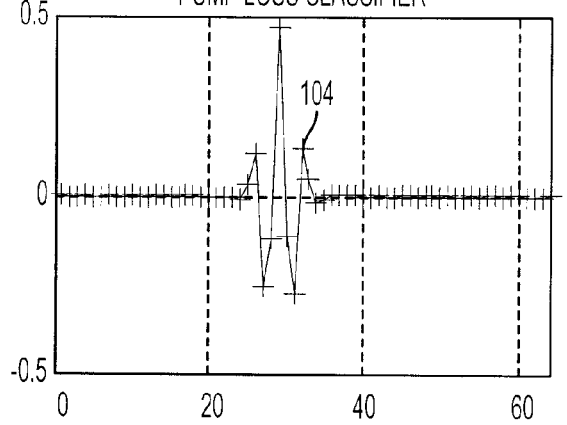
FIG. 8C is a plot of a high pass filter response to the change in differential loop gain depicted in FIG. 8A.
Figure 9A:
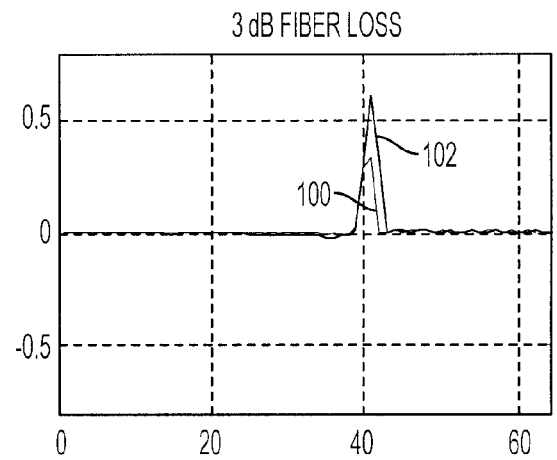
FIG. 9A includes a plot of a change in differential loop gain vs. repeater loop back number associated with a 3 dB fiber loss, along with a plot of an impulse response for a low pass filter wavelet function consistent with the present disclosure.
Figure 9B:
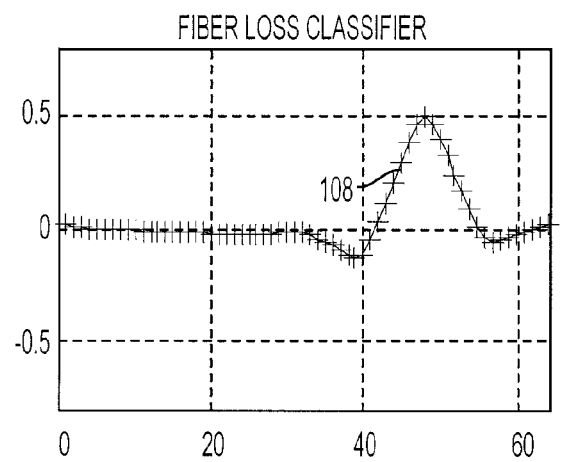
FIG. 9B is a plot of a low pass filter response to the change in differential loop gain depicted in FIG. 9A.
Figure 9C:
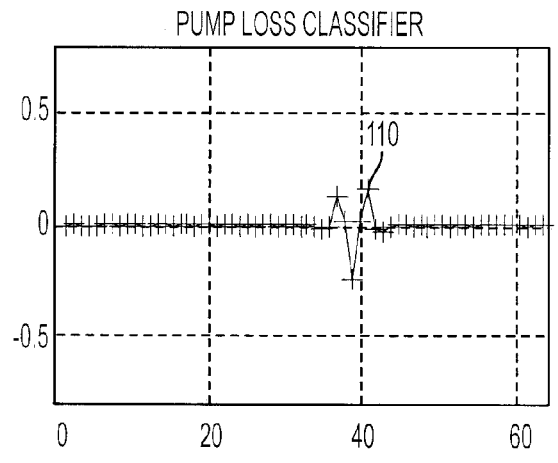
FIG. 9C is a plot of a high pass filter response to the change in differential loop gain depicted in FIG. 9A.

FIG. 8A includes a plot 96 of a change in differential loop gain vs. repeater loop back number associated with a mid-system 3 dB reduction in repeater pump power, i.e. extra pump loss, along with a plot 98 of an impulse response for a high pass filter wavelet function useful in providing an extra pump loss loop gain fault signature in an exemplary system consistent with the present disclosure. FIG. 9A includes a plot 100 of a change in differential loop gain vs. repeater loop back number associated with a mid-system 3 dB fiber loss, i.e. extra fiber loss, along with a plot 102 of an impulse response for a low pass filter wavelet function useful in providing an extra pump loss loop gain fault signature in an exemplary system consistent with the present disclosure. Comparison, e.g., convolution, of the data associated with plot 96 with the impulse response of plot 98 may result in output illustrated in plot 104 of FIG. 8C indicating extra pump loss is present. Comparison of the data associated with plot 96 with the impulse response of plot 102 may result in minimal response illustrated in plot 106 of FIG. 8B, since no extra fiber loss is present. Comparison, e.g. convolution, of the data associated with plot 100 with the impulse response of plot 102 may result in output illustrated in plot 108 of FIG. 9B indicating extra fiber loss is present. Comparison of the data associated with plot 100 with the impulse response of plot 98 may result in minimal response illustrated in plot 110 of FIG. 9C, since no extra pump loss is present.

Figure 10:
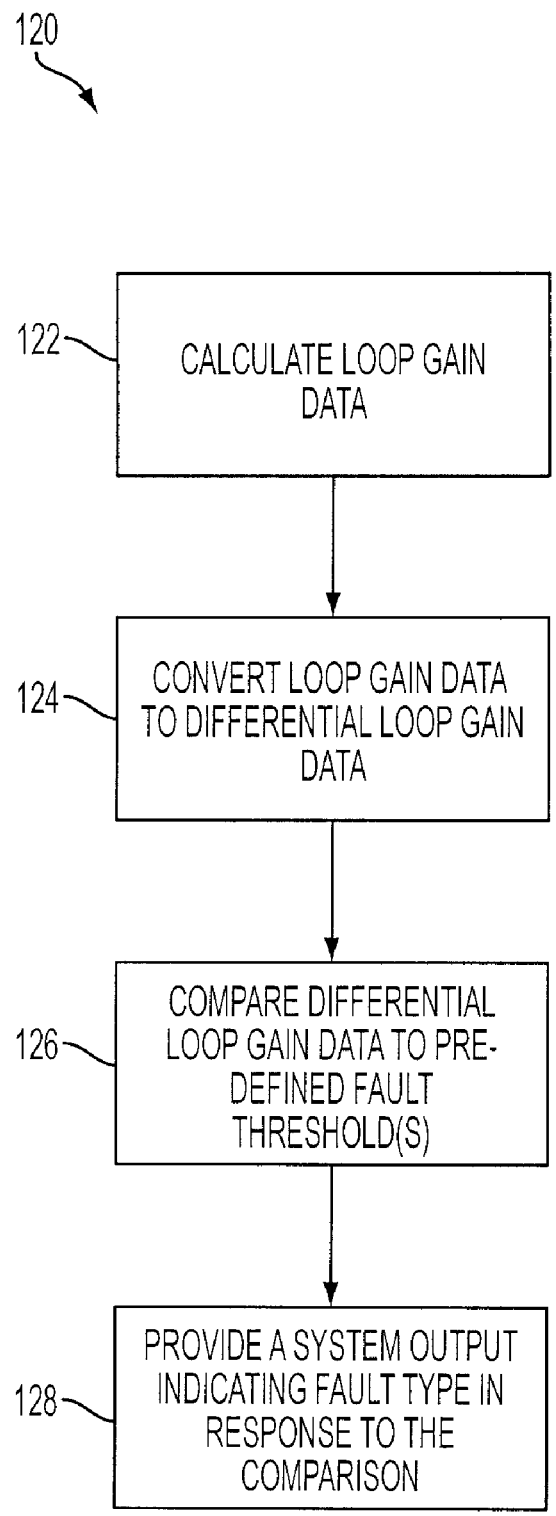
FIG. 10 is a block flow diagram illustrating one example of a process consistent with the present disclosure.

FIG. 10 is a block flow diagram of one exemplary process 120 consistent with the present disclosure. The block flow diagrams used herein to describe various embodiments include particular sequences of steps. It can be appreciated, however, that the sequence of steps merely provides an example of how the general functionality described herein can be implemented. Further, each sequence of steps does not have to be executed in the order presented unless otherwise indicated.

In the exemplary embodiment illustrated in FIG. 6, loop gain data may be calculated 122 from comparison of the transmitted LME signals and the retuned LME signals. The loop gain data may be converted 124 to differential loop gain data associated with each repeater in the system. The differential loop gain data may be compared 126 to one or more predetermined differential loop gain fault thresholds, e.g. associated with different system fault types such as extra fiber loss, extra pump loss, etc. An LME system output may be provided 128 to identify the type of system fault in response to the comparison.

Figure 11:
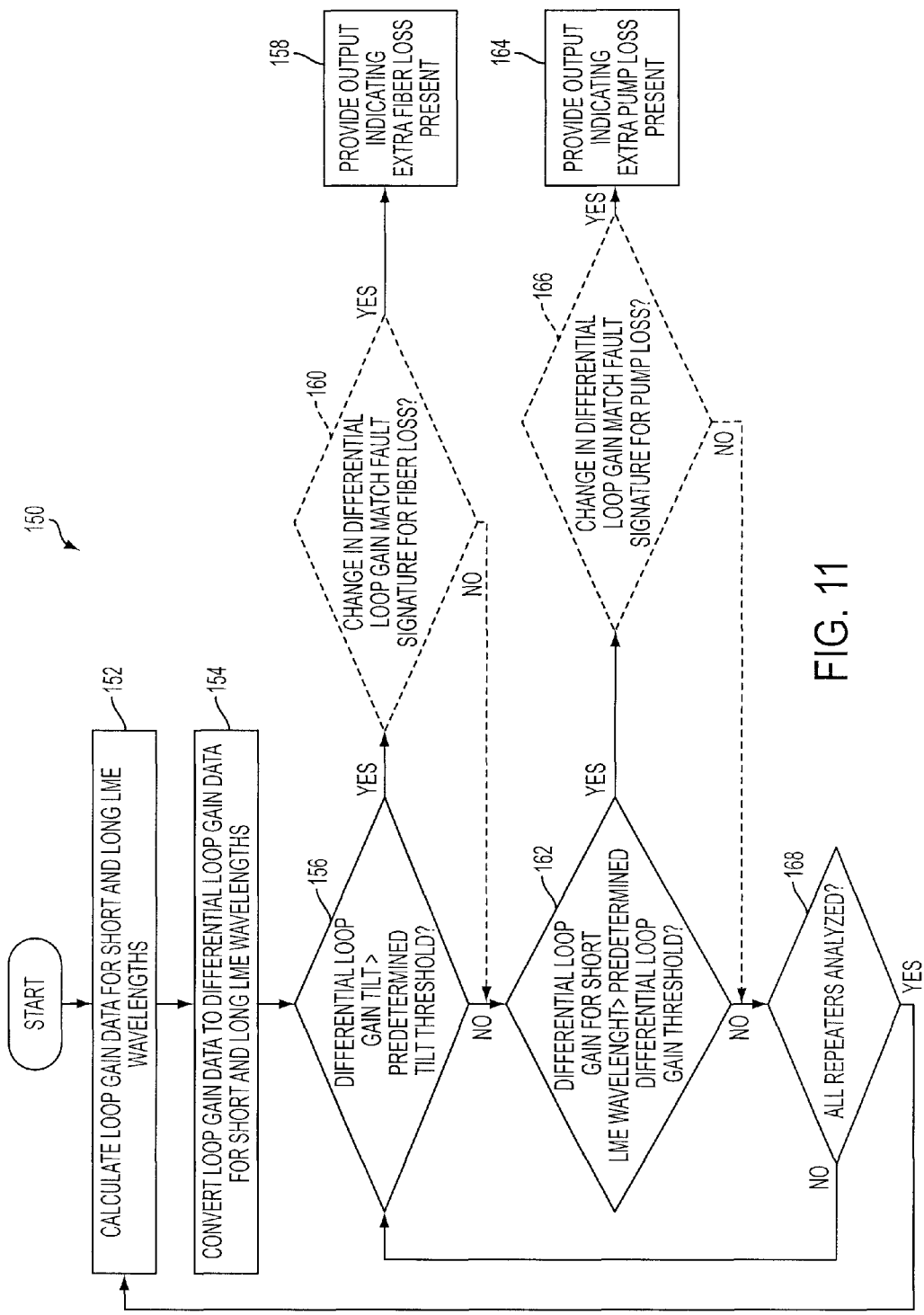
FIG. 11 is a flow chart illustrating another example of a process consistent with the present disclosure.

FIG. 11 is a block flow diagram of another exemplary process 150 consistent with the present disclosure configured to differentiate between extra fiber loss and extra pump loss. In the illustrated exemplary embodiment, short and long LME wavelength loop gain data may be calculated 152 for each repeater from comparison of the transmitted LME signals and the retuned LME signals. The loop gain data may be converted 154 to short and long LME wavelength differential loop gain data associated with each repeater in the system. Differential loop gain tilt may be analyzed 156, to determine whether the gain tilt exceeds a pre-determined tilt threshold, e.g. 0.2 dB in one embodiment.

If the gain tilt threshold is exceeded, an output may be provided 158 indicating that extra fiber loss is present. The change in differential loop gain may optionally be compared 160 to a fault signature corresponding to fiber loss, e.g. to a low pass filter of a set of matched filters as described above. If the differential loop gain data matches 160 the fault signature for fiber loss, the output 158 indicating that extra fiber loss is present may be provided. Otherwise, flow may pass to step 162.

If the gain tilt threshold is not exceeded, differential loop gain for the short LME wavelength may be analyzed 162 to determine whether the differential loop gain exceeds a predetermined differential loop gain threshold, e.g. 0.2 dB in one embodiment. If the predetermined differential loop gain threshold is exceeded, an output may be provided 164 indicating extra pump loss is present. The change in differential loop gain may optionally be compared 166 to a fault signature corresponding to pump loss, e.g. to a high pass filter of a set of matched filters as described above. If the differential loop gain data matches 166 the fault signature for pump loss, the output 164 indicating that extra pump loss is present may be provided. Otherwise, flow may pass to step 168

If the predetermined loop gain threshold is not exceeded, if all repeaters have not been analyzed 168 the process returns to step 156 to continue the process for each repeater in the system. If all repeaters have been analyzed 168 the process returns to step 152 to continuously analyze system faults.

There is thus provided a system and method using differential loop gain for fault identification in optical transmission line monitoring equipment. According to one aspect of the disclosure, there is provided a line monitoring system for an optical communication system including a test signal transmitter configured to provide a test signal for transmission on an optical communication system, the optical communication system including a first optical fiber path for receiving the test signal and carrying the test signal in a first direction, a second optical fiber path for carrying signals in a second direction opposite from the first direction, and a plurality of loop back paths, each of the loop back paths coupling the test signal to the second optical fiber path as an associated returned test signal; and a correlator configured to calculate differential loop gain data associated with each of the loop back paths from the associated returned test signals and provide an output identifying a fault in the optical communication system in response to the differential loop gain data.

According to another aspect of the disclosure, there is provided an optical communication system including: a test signal transmitter configured to provide a test signal; a first optical fiber path for receiving the test signal and carrying the test signal in a first direction; a second optical fiber path for carrying signals in a second direction opposite from the first direction; a plurality of loop back paths, each of the loop back paths coupling the test signal to the second optical fiber path as an associated returned test signal; and a correlator configured to calculate differential loop gain data associated with each of the loop back paths from the associated returned test signals and provide an output identifying a fault in the optical communication system in response to the differential loop gain data.

According to yet another aspect of the disclosure, there is provided a method of monitoring an optical communication system including a plurality of loop back paths coupling a first fiber optic path for carrying signals in a first direction and a second fiber optic path for carrying signals in a second direction opposite to the first direction, the method including: transmitting a test signal on the first fiber optic path; receiving an associated returned test signal from each of the loop back paths from the second fiber optic path; calculating differential loop gain data associated with each of the loop back paths from the returned test signals; identifying a fault in the optical communication system in response to the differential loop gain data.

The embodiments that have been described herein but some of the several which utilize this invention and are set forth here by way of illustration but not of limitation. Many other embodiments, which will be readily apparent to those of ordinary skill in the art, may be made without departing materially from the spirit and scope of the invention

What is claimed is:

1. A line monitoring system for an optical communication system comprising:
a test signal transmitter configured to provide a test signal for transmission on an optical communication system, the optical communication system comprising
a first optical fiber path for receiving said test signal and carrying said test signal in a first direction,
a second optical fiber path for carrying signals in a second direction opposite from said first direction, and
a plurality of loop back paths, each of said loop back paths coupling said test signal to said second optical fiber path as an associated returned test signal; and
a correlator configured to calculate differential loop gain data associated with each of said loop back paths from said associated returned test signals and provide an output identifying a fault in the optical communication system in response to said differential loop gain data, said differential loop gain data comprising, for each one of said loop back paths,
a loop gain imparted to said test signal through said each one of said loop back paths, minus
a previous loop back path loop gain imparted to said test signal through one of said loop back paths preceding said each one of said loop back paths.

2. A line monitoring system according to claim 1, wherein said correlator is configured to compare said differential loop gain data with a predetermined differential loop gain fault signature corresponding to said fault in the optical communication system.

3. A line monitoring system according to claim 1, wherein said fault is an extra fiber loss fault in said optical communication system.

4. A line monitoring system according to claim 1, wherein said fault is an extra pump loss fault in said optical communication system.

5. A line monitoring system according to claim 1, wherein said differential loop gain data comprises differential loop gain tilt data.

6. A line monitoring system according to claim 1, wherein a said test signal comprises a short LME wavelength signal and a long LME wavelength signal, said long LME wavelength signal having a wavelength longer than a wavelength of said short LME wavelength signal.

7. A line monitoring system according to claim 6, wherein said wavelength of said short LME wavelength signal is at a short wavelength end of a data signal transmission band of the optical communication system and said wavelength of said long LME wavelength signal is at a long wavelength end of a said data signal transmission band of the optical communication system.

8. A line monitoring system according to claim 1, wherein said test signal transmitter comprises a polarization scrambler for scrambling the state of polarization of said test signal.

9. A line monitoring system according to claim 1, wherein each of said loop back paths is disposed in an associated repeater coupled to said first and second fiber paths, each of said repeaters comprising a first amplifier for amplifying signals on said first optical fiber path and a second amplifier for amplifying signals on said second optical fiber path.

10. An optical communication system comprising:
a test signal transmitter configured to provide a test signal;
a first optical fiber path for receiving said test signal and carrying said test signal in a first direction;
a second optical fiber path for carrying signals in a second direction opposite from said first direction;
a plurality of loop back paths, each of said loop back paths coupling said test signal to said second optical fiber path as an associated returned test signal; and
a correlator configured to calculate differential loop gain data associated with each of said loop back paths from said associated returned test signals and provide an output identifying a fault in the optical communication system in response to said differential loop gain data, said differential loop gain data comprising, for each one of said loop back paths,
a loop gain imparted to said test signal through said each one of said loop back paths, minus
a previous loop back path loop gain imparted to said test signal through one of said loop back paths preceding said each one of said loop back paths.

11. An optical communication system according to claim 10, wherein said correlator is configured to compare said differential loop gain data with a predetermined differential loop gain fault signature corresponding to said fault in the optical communication system.

12. An optical communication system according to claim 10, wherein said fault is an extra fiber loss fault in said optical communication system.

13. An optical communication system according to claim 10, wherein said fault is an extra pump loss fault in said optical communication system.

14. An optical communication system according to claim 10, wherein said differential loop gain data comprises differential loop gain tilt data.

15. An optical communication system according to claim 10, wherein a said test signal comprises a short LME wavelength signal and a long LME wavelength signal, said long LME wavelength signal having a wavelength longer than a wavelength of said short LME wavelength signal.

16. An optical communication system according to claim 15, wherein said wavelength of said short LME wavelength signal is at a short wavelength end of a data signal transmission band of the optical communication system and said wavelength of said long LME wavelength signal is at a long wavelength end of a said data signal transmission band of the optical communication system.

17. An optical communication system according to claim 10, wherein said test signal transmitter comprises a polarization scrambler for scrambling the state of polarization of said test signal.

18. An optical communication system according to claim 10, wherein each of said loop back paths is disposed in an associated repeater coupled to said first and second fiber paths, each of said repeaters comprising a first amplifier for amplifying signals on said first optical fiber path and a second amplifier for amplifying signals on said second optical fiber path.

19. A method of monitoring an optical communication system comprising a plurality of loop back paths coupling a first fiber optic path for carrying signals in a first direction and a second fiber optic path for carrying signals in a second direction opposite to the first direction, said method comprising:

transmitting a test signal on the first fiber optic path;
receiving an associated returned test signal from each of the loop back paths from the second fiber optic path;
calculating differential loop gain data associated with each of said loop back paths from the returned test signals; and
identifying a fault in the optical communication system in response to said differential loop gain data, said differential loop gain data comprising, for each one of said loop back paths,
a loop gain imparted to said test signal through said each one of said loop back paths, minus
a previous loop back path loop gain imparted to said test signal through one of said loop back paths preceding said each one of said loop back paths.

20. A method according to claim 19, wherein said identifying a fault comprises comparing said differential loop gain data with a predetermined differential loop gain fault signature corresponding to said fault.

21. A method according to claim 19, wherein said fault is an extra fiber loss fault in said optical communication system.

22. A method according to claim 19, wherein said fault is an extra pump loss fault in said optical communication system.

23. A method according to claim 19, wherein said differential loop gain data comprises differential loop gain tilt data.

24. A method according to claim 19, wherein a said test signal comprises a short LME wavelength signal and a long LME wavelength signal, said long LME wavelength signal having a wavelength longer than a wavelength of said short LME wavelength signal.

25. A method according to claim 24, wherein said wavelength of said short LME wavelength signal is at a short wavelength end of a data signal transmission band of the optical communication system and said wavelength of said long LME wavelength signal is at a long wavelength end of a said data signal transmission band of the optical communication system.

26. A method according to claim 19, said method further comprising scrambling the state of polarization of said test signal.

27. A method according to claim 19, wherein each of said loop back paths is disposed in an associated repeater coupled to said first and second fiber paths, each of said repeaters comprising a first amplifier for amplifying signals on said first optical fiber path and a second amplifier for amplifying signals on said second optical fiber path.

28. A method of monitoring an optical communication system comprising a plurality of loop back paths coupling a first fiber optic path for carrying signals in a first direction and a second fiber optic path for carrying signals in a second direction opposite to the first direction, said method comprising:

transmitting a test signal on the first fiber optic path;
receiving an associated returned test signal from each of the loop back paths from the second fiber optic path;
calculating gain data associated with each of said loop back paths from the returned test signals;
comparing said gain data with a predetermined gain fault signature representative of a fault in said optical communication system; and
identifying said fault in the optical communication system in response to said comparing of said gain data with said predetermined fault signature.

* * * * *